US011864581B2

(12) United States Patent
Rossoll et al.

(10) Patent No.: US 11,864,581 B2
(45) **Date of Patent: *Jan. 9, 2024**

(54) SUSCEPTOR ASSEMBLY FOR INDUCTIVELY HEATING AN AEROSOL-FORMING SUBSTRATE

(71) Applicant: PHILIP MORRIS PRODUCTS S.A., Neuchatel (CH)

(72) Inventors: Andreas Rossoll, Le Mont-sur-Lausanne (CH); Oleg Fursa, Gempenach (CH)

(73) Assignee: PHILIP MORRIS PRODUCTS S.A., Neuchatel (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/739,319

(22) Filed: May 9, 2022

(65) Prior Publication Data

US 2022/0256915 A1 Aug. 18, 2022

Related U.S. Application Data

(63) Continuation of application No. 16/495,892, filed as application No. PCT/EP2018/058039 on Mar. 29, 2018, now Pat. No. 11,399,564.

(30) Foreign Application Priority Data

Mar. 31, 2017 (EP) .................................... 17164354

(51) Int. Cl.
*A24F 13/00* (2006.01)
*A24D 1/20* (2020.01)
(Continued)

(52) U.S. Cl.
CPC .............. *A24D 1/20* (2020.01); *A24B 15/167* (2016.11); *H05B 6/108* (2013.01); *A24F 40/20* (2020.01); *A24F 40/465* (2020.01)

(58) Field of Classification Search
CPC ...................................................... A24F 47/00
(Continued)

(56) References Cited

U.S. PATENT DOCUMENTS 4,309,489 A 1/1982 Momose
5,427,846 A 6/1995 McGaffigan
(Continued)

FOREIGN PATENT DOCUMENTS

CN 102877016 A 1/2013
CN 203537580 U 4/2014
(Continued)

OTHER PUBLICATIONS

Philippine Substantive Examination Report dated Aug. 26, 2022 in Philippine Patent Application No. 1/2019/502139, 5 pages.
(Continued)

*Primary Examiner* — Phuong K Dinh
(74) *Attorney, Agent, or Firm* — Oblon, McClelland, Maier & Neustadt, L.L.P.

(57) ABSTRACT

A susceptor assembly for inductively heating an aerosol-forming substrate includes a first susceptor and a second susceptor. At least a portion of an outer surface of the second susceptor comprises an anti-corrosion covering and at least a portion of an outer surface of the first susceptor is exposed. An aerosol-generating article can include an aerosol-forming substrate and the susceptor assembly.

14 Claims, 5 Drawing Sheets

(51) Int. Cl.

| | |
|---|---|
| ***A24B 15/167*** | (2020.01) |
| ***H05B 6/10*** | (2006.01) |
| *A24F 40/20* | (2020.01) |
| *A24F 40/465* | (2020.01) |

(58) Field of Classification Search
USPC .................................................. 131/328–329
See application file for complete search history.

(56) References Cited

U.S. PATENT DOCUMENTS

| | | | | |
|---|---|---|---|---|
| 11,399,564 | B2 * | 8/2022 | Rossoll .................. | H05B 6/108 |
| 2008/0035682 | A1 | 2/2008 | Coffey et al. | |
| 2008/0128078 | A1 | 6/2008 | May | |
| 2018/0310622 | A1 * | 11/2018 | Mironov .................. | A24D 1/20 |

FOREIGN PATENT DOCUMENTS

| | | | |
|---|---|---|---|
| CN | 105077597 | A | 11/2015 |
| CN | 105407750 | A | 3/2016 |
| CN | 106455712 | A | 2/2017 |
| DE | 10257290 | | 6/2004 |
| IN | 201617028283 | A | 1/2017 |
| JP | 2016-525341 | A | 8/2016 |
| RU | 2 450 780 | C2 | 5/2012 |
| RU | 2 602 053 | C2 | 12/2012 |
| WO | 82/03305 | | 9/1982 |
| WO | 2015/176898 | | 11/2015 |
| WO | 2015/177045 | | 11/2015 |
| WO | 2015/177263 | | 11/2015 |
| WO | 2015/177265 | | 11/2015 |
| WO | 2015/177294 | | 11/2015 |
| WO | 2016/184928 | | 11/2016 |

OTHER PUBLICATIONS

Notice of Grounds for Rejection dated May 10, 2022 in corresponding Japanese Patent Application No. 2019-553313, (with English translation)(18 pages).

Combined Chinese Office Action and Search Report dated Nov. 30, 2021 in corresponding Chinese Patent Application No. 201880021320.1 (with English translation) citing documents AP-AU therein, 16 pages.

Combined Taiwanese Office Action and Search Report dated May 24, 2021 in Taiwanese Patent Application No. 10711010 (submitting English translation only), 9 pages.

Indian Office Action dated Jul. 15, 2021, in Indian Patent Application No. 201917043663, 5 pages.

Combined Office Action and Search Report dated Aug. 26, 2021, in corresponding Russian Patent Application No. 2019134804 (with English translation), citing documents AN-AO therein, 12 pages.

Decision on Examination dated Nov. 10, 2021 in Taiwanese Patent Application No. 107111010 (with English translation), 8 pages.

PCT Search Report and Written Opinion for PCT/EP2018/058039 dated Jul. 10, 2018.

Combined Taiwanese Office Action and Search Report dated Jun. 7, 2022 in Taiwanese Patent Application No. 107111010 (submitting English translation only), 9 pages.

Korean Office Action dated Mar. 29, 2023 in Korean Patent Application No. 10-2019-7031776 (with English translation), citing document 15 therein, 14 pages.

* cited by examiner

SUSCEPTOR ASSEMBLY FOR INDUCTIVELY HEATING AN AEROSOL-FORMING SUBSTRATE

CROSS-REFERENCE TO RELATED APPLICATIONS

This application is a Continuation of U.S. patent application Ser. No. 16/495,892 filed Sep. 20, 2019, which is a 371 of international application no. PCT/EP2018/058039 filed Mar. 29, 2018, and claims priority of European patent application no. 17164354.7 filed Mar. 31, 2017. The entire contents of the above applications are incorporated herein.

The present invention relates to a susceptor assembly for inductively heating an aerosol-forming substrate and a method for producing such an assembly. The invention further relates to an aerosol-generating article comprising an aerosol-forming substrate as well as to a susceptor assembly for inductively heating the substrate.

Aerosol-generating articles, which include an aerosol-forming substrate to form an inhalable aerosol upon heating, are generally known from prior art. For heating the substrate, the aerosol-generating article may be received within an aerosol-generating device comprising an electrical heater. The heater may be an inductive heater comprising an induction source. The induction source generates an alternating electromagnetic field that induces heat generating eddy currents and/or hysteresis losses in a susceptor. The susceptor itself is in thermal proximity of the aerosol-forming substrate to be heated. In particular, the susceptor may be integrated in the article in direct physical contact with the aerosol-forming substrate.

For controlling the temperature of the substrate, susceptor assemblies have been proposed comprising a first and a second susceptor made of different materials. The first susceptor material is optimized with regard to heat loss and thus heating efficiency. In contrast, the second susceptor material is used as temperature marker. For this, the second susceptor material is chosen such as to have a Curie temperature corresponding to a predefined heating temperature of the susceptor assembly. At its Curie temperature, the magnetic properties of the second susceptor change from ferromagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached.

The material of the second susceptor may comprise pure nickel or a nickel alloy having a Curie temperature which is well suited for most applications. However, nickel or a nickel alloys may run the risk of being subject to aging, in particular corrosion, when being in contact with the aerosol-forming substrate for a prolonged period of time. This is to be expected in particular for those aerosol-generating articles having a susceptor embedded in the aerosol-forming substrate.

Therefore, it would be desirable to have a susceptor assembly for inductive heating of aerosol-forming substrate with the advantages of prior art solutions but without their limitations. In particular, it would be desirable to have a susceptor assembly and an aerosol-generating article including such a susceptor assembly which has improved aging characteristics.

According to the invention there is provided a susceptor assembly for inductively heating an aerosol-forming substrate, which comprises a first susceptor and a second susceptor. The second susceptor has a Curie temperature which is lower than 500° C. At least a portion of an outer surface of the second susceptor comprises an anti-corrosion covering. In contrast, at least a portion of an outer surface of the first susceptor is exposed.

As used herein, the term "susceptor" refers to an element that is capable to convert electromagnetic energy into heat when subjected to a changing electromagnetic field. This may be the result of hysteresis losses and/or eddy currents induced in the susceptor, depending on the electrical and magnetic properties of the susceptor material. The material and the geometry for the susceptor assembly can be chosen to provide a desired heat generation.

Preferably, the first susceptor may also have a Curie temperature. Advantageously, the Curie temperature of the first susceptor is distinct from, in particular higher than the Curie temperature of the second susceptor.

As used herein, the terms "first susceptor has a Curie temperature" or "second susceptor has a Curie temperature" mean that the first or the second susceptor may comprise a first or second susceptor material, respectively, each having a specific Curie temperature. Accordingly, the first susceptor material may have a first Curie temperature and the second susceptor material may have a second Curie temperature. The Curie temperature is the temperature above which a ferrimagnetic or ferromagnetic material loses its ferrimagnetism or ferromagnetism, respectively, and becomes paramagnetic.

By having at least a first and a second susceptor, with either the second susceptor having a Curie temperature and the first susceptor not having a Curie temperature, or first and second susceptors having each Curie temperatures distinct from one another, the susceptor assembly may provide multiple functionalities, such as inductive heating and controlling of the heating temperature. In particular, these functionalities may be separated due to the presence of at least two different susceptors.

Preferably, the first susceptor is configured for heating the aerosol-forming substrate. For this, the first susceptor may be optimized with regard to heat loss and thus heating efficiency.

The first susceptor, that is the material of the first susceptor, may have a Curie temperature in excess of 400° C.

Preferably, the first susceptor is made of an anti-corrosive material. Thus, the first susceptor is advantageously resistant to any corrosive influences, in particular in case the susceptor assembly is embedded in an aerosol-generating article in direct physical contact with aerosol-forming substrate.

The first susceptor may comprise a ferromagnetic metal. In this case, heat cannot only by generated by eddy current but also by hysteresis losses. Preferably, the first susceptor comprises iron or an iron alloy such as steel, or an iron nickel alloy. It may be particularly preferred that the first susceptor comprises a 400 series stainless steel such as grade 410 stainless steel, or grade 420 stainless steel, or grade 430 stainless steel, or stainless steel of similar grades.

The first susceptor material may alternatively comprise a suitable non-magnetic, in particular paramagnetic, conductive material, such as aluminum. In a non-magnetic conductive material inductive heating occurs solely by resistive heating due to eddy currents.

Alternatively, the first susceptor may comprise a non-conductive ferrimagnetic material, such as a non-conductive ferrimagnetic ceramic. In that case, heat is only by generated by hysteresis losses.

In contrast, the second susceptor may be optimized and configured for monitoring a temperature of the susceptor assembly. The second susceptor may be selected to have a Curie temperature which essentially corresponds to a predefined maximum heating temperature of the first susceptor. The maximum desired heating temperature may be defined to be approximately the temperature that the susceptor should be heated to in order to generate an aerosol from the aerosol-forming substrate. However, the maximum desired heating temperature should be low enough to avoid local overheating or burning of the aerosol-forming substrate. Preferably, the Curie temperature of the second susceptor should be below an ignition point of the aerosol-forming substrate. The second susceptor is selected for having a detectable Curie temperature below 500° C., preferably equal to or below 400° C., in particular equal to or below 370° C. For example, the second susceptor may have a specified Curie temperature between 150° C. and 400° C., in particular between 200° C. and 400° C. Though the Curie temperature and the temperature marker function is the primary property of the second susceptor, it may also contribute to the heating of the susceptor.

Preferably, the second susceptor material comprises a ferromagnetic metal such as nickel or a nickel alloy. Nickel has a Curie temperature in the range of about 354° C. to 360° C. or 627 K to 633 K, respectively, depending on the nature of impurities. A Curie temperature in this range is ideal because it is approximately the same as the temperature that the susceptor should be heated to in order to generate an aerosol from the aerosol-forming substrate, but still low enough to avoid local overheating or burning of the aerosol-forming substrate.

According to the invention, at least a portion of an outer surface of the second susceptor comprises an anti-corrosion covering. Advantageously, the anti-corrosive covering improves the aging characteristics of the second susceptor as at least the covered portion of the outer surface of the second susceptor is not directly exposed to the environment. In particular, the covered portion of the outer surface of the second susceptor is protected from any corrosive influence, in particular in case the susceptor assembly is embedded in an aerosol-generating article in direct physical contact with aerosol-forming substrate. Advantageously, at least that portion or those portions of the outer surface of the second susceptor may comprise an anti-corrosion covering which otherwise would be in direct contact with aerosol-forming substrate.

As used herein, the term "anti-corrosion covering" refers to a covering that is different and separate from the first and second susceptor. In particular, any oxide layer being possibly present on a surface of the first or second susceptor and resulting from an oxidation of the material of the first or second susceptor, respectively, is not to be considered an anti-corrosion covering according to the present invention.

To maximize anti-corrosion protection of the second susceptor, all portions of the outer surface of the second susceptor, unless in intimate physical contact with the first susceptor, may comprise an anti-corrosion covering.

In contrast to this, at least a portion of an outer surface of the first susceptor is unprotected, that is bare, exposed to or in direct contact with the environment. In particular in case the susceptor assembly is embedded in an aerosol-forming substrate, at least a portion of an outer surface of the first susceptor is exposed to and in direct physical contact with the aerosol-forming substrate. Advantageously, this allows for a good heat transfer to the aerosol-forming substrate which is preferably and primarily to be heated by the first susceptor. Preferably, all portions of an outer surface of the first susceptor, unless in intimate physical contact with the second susceptor, are unprotected, bare or exposed to the environment. Advantageously, this ensures maximum heat transfer to the aerosol-forming substrate.

The anti-corrosion covering may comprise at least one of a corrosion-proof metal, an inert metal, a corrosion-proof alloy, a corrosion-proof organic coating, a glass, a ceramic, a polymer, an anti-corrosion paint, a wax or a grease.

Preferably, the anti-corrosion covering is paramagnetic. Advantageously, a paramagnetic anti-corrosion covering—if at all—shows only weak magnetic shielding effects on the second susceptor covered thereby. Thus, the second susceptor, though at least partially covered, may still experience the alternating, in particular high-frequency electromagnetic field applied to the susceptor assembly for inductive heating. Therefore, a paramagnetic anti-corrosion covering does not impair the preferred functionality of the second susceptor as temperature marker. Preferably, the anti-corrosion covering comprises a paramagnetic or austenitic stainless steel.

For example, the anti-corrosion covering may comprise austenitic stainless steel applied to at least a portion of an outer surface of the second susceptor by cladding. According to another example, the anti-corrosion covering may comprise a Zn-based coating, applied to at least a portion of an outer surface of the second susceptor by dip coating or galvanic coating. According to yet another example, the anti-corrosion covering may comprise an aluminum coating applied to at least a portion of an outer surface of the second susceptor for example by a sol-gel process. Alternatively, the anti-corrosion covering may comprise a silane coating or a polyamide-imide (PAI) coating.

Preferably, the first susceptor and the second susceptor are in intimate physical contact with each other. In particular, the first and second susceptor may form a unitary susceptor assembly. Thus, when heated the first and second susceptor have essentially the same temperature. Due to this, the temperature control of the first susceptor by the second susceptor is highly accurate. Intimate contact between the first susceptor and the second susceptor may be accomplished by any suitable means. For example, the second susceptor may be plated, deposited, coated, cladded or welded onto the first susceptor. Preferred methods include electroplating (galvanic plating), cladding, dip coating or roll coating.

The first susceptor and second susceptor may comprise a variety of geometrical configurations. In particular, the first susceptor or the second susceptor or both, the first and the second susceptor, may be of one of particulate, or filament, or mesh-like or planar or blade-like configuration.

As an example, at least one of the first susceptor and the second susceptor, respectively, may be of particulate configuration. The particles may have an equivalent spherical diameter of 10 μm to 100 μm. The particles may be distributed throughout the aerosol-forming substrate, either homogenously or with local concentration peaks or according to a concentration gradient. In case the second susceptor is of particulate configuration, the entire outer surface of the particulate second susceptor preferably comprises an anti-corrosion covering.

As another example, the first or the second susceptor or both, the first and the second susceptor, may be of a filament or mesh-like configuration. Filament or mesh-like structures may have advantages with regard to their manufacture, their geometrical regularity and reproducibility. The geometrical regularity and reproducibility may prove advantageous in both, temperature control and controlled local heating. In case the second susceptor is of a filament or mesh-like configuration, the entire outer surface of the second susceptor preferably comprises an anti-corrosion covering.

The first susceptor and the second susceptor may be of different geometrical configurations. Thus, the first and second susceptors may be tailored to their specific function. The first susceptor, preferably having a heating function, may have a geometrical configuration which presents a large surface area to the aerosol-forming substrate in order to enhance heat transfer. In contrast, the second susceptor, preferably having a temperature control function, does not need to have a very large surface area.

As an example, the first susceptor may be of a filament or mesh-like configuration, whereas the second susceptor is of particulate configuration. Both, the filament or mesh-like first susceptor and the particulate second susceptor may be embedded in an aerosol-generating article in direct physical contact with the aerosol-forming substrate to be heated. In this specific configuration, the first susceptor may extend within the aerosol-forming substrate through a center of the aerosol-generating article, while the second susceptor may be homogenously distributed throughout the aerosol-forming substrate.

Alternatively, it may be desirable, e.g. for manufacturing purposes of the aerosol-forming substrate, that the first and second susceptors are of similar geometrical configuration.

The first susceptor may form or include the anti-corrosion covering. Or vice versa, the anti-corrosion covering may be part of the first susceptor. In particular, the first susceptor may sandwich or encapsulate the second susceptor.

Preferably, the susceptor assembly is a multilayer susceptor assembly. The first susceptor, the second susceptor and the anti-corrosion covering may form adjacent layers of the multilayer susceptor assembly. In this configuration, the second susceptor layer is sandwiched between the first susceptor layer and the anti-corrosion covering layer. In particular, the anti-corrosion covering may be an edge layer of the multilayer susceptor assembly.

In the multilayer susceptor assembly, the first susceptor, the second susceptor and the anti-corrosion covering may be intimate physical contact with each other.

The second susceptor may be plated, deposited, coated, cladded or welded onto the first susceptor. Likewise, the anti-corrosion covering may be deposited, coated, cladded or welded onto the second susceptor. Preferably, the anti-corrosion covering is at least on a side of the second susceptor layer opposite to a side to which the first susceptor is attached. Preferably, the second susceptor is applied onto the first susceptor by spraying, dip coating, roll coating, electroplating or cladding. Likewise, the anti-corrosion covering preferably is applied onto the second susceptor by spraying, dip coating, roll coating, electroplating or cladding.

The individual layers of the multilayer susceptor assembly may be bare or exposed to the environment on a circumferential outer surface of the multilayer susceptor assembly as viewed in a direction parallel to the layers. In other words, the layer structure may be visible on a circumferential outer surface of the multilayer susceptor assembly as viewed in a direction parallel to the layers. In particular, a circumferential outer surface of the second susceptor layer may be exposed to the environment, but not covered by the anti-corrosion covering. Alternatively, in addition to the top and bottom surface, a circumferential outer surface of the second susceptor layer may be covered. In this case, the anti-corrosion covering is applied to the entire outer surface of the second susceptor layer which is not in intimate contact with first susceptor layer. In addition, a circumferential outer surface of the first susceptor layer may also be covered by the anti-corrosion covering.

It is preferred that the second susceptor is present as a dense layer. A dense layer has a higher magnetic permeability than a porous layer, making it easier to detect fine changes at the Curie temperature.

The multilayer susceptor assembly may be an elongated susceptor assembly having a length of between 5 mm and 15 mm, a width of between 3 mm and 6 mm and a thickness of between 10 μm and 500 μm. As an example, the multilayer susceptor assembly may be an elongated strip, having a first susceptor which is a strip of 430 grade stainless steel having a length of 12 mm, a width of between 4 mm and 5 mm, for example 4 mm, and a thickness of between 10 μm and 50 μm, such as for example 25 μm. The grade 430 stainless steel may be coated with a layer of nickel as second susceptor having a thickness of between 5 μm and 30 μm, for example 10 μm. On top of the second susceptor layer, opposite the side of the second susceptor layer being in intimate contact with the first susceptor layer, an anti-corrosion covering is coated. The material of the covering may comprise a ceramic or an austenitic stainless steel.

The term "thickness" is used herein to refer to dimensions extending between the top and the bottom side, for example between a top side and a bottom side of a layer or a top side and a bottom side of the multilayer susceptor assembly. The term "width" is used herein to refer to dimensions extending between two opposed lateral sides. The term "length" is used herein to refer to dimensions extending between the front and the back or between other two opposed sides orthogonal to the two opposed lateral sides forming the width. Thickness, width and length may be orthogonal to each other.

If the first susceptor material is optimized for heating of the substrate, it may be preferred that there is no greater volume of the second susceptor material than is required to provide a detectable second Curie point. Therefore, instead of continuous layer structure, the second susceptor may comprise one or more second susceptor elements. Each of the susceptor elements may have a volume smaller than a volume of the first susceptor. Each of the susceptor elements may be in intimate physical contact with the first susceptor. In this specific configuration, at least a portion of an outer surface of each second susceptor elements may comprise an anti-corrosion covering. As an example, the first susceptor is in the form of an elongate strip, whereas the second susceptor material is in the form of discrete patches that are plated, deposited, or welded onto the first susceptor material. Each patch may comprise an anti-corrosion covering at least on a portion of its outer surface that is not in intimate physical contact with the first susceptor strip.

The susceptor assembly according to the present invention may be preferably configured to be driven by an alternating, in particular high-frequency electromagnetic field. As referred to herein, the high-frequency electromagnetic field may be in the range between 500 kHz to 30 MHz, in particular between 5 MHz to 15 MHz, preferably between 5 MHz and 10 MHz.

The susceptor assembly preferably is a susceptor assembly of an aerosol-generating article for inductively heating an aerosol-forming substrate which is part of the aerosol-generating article.

According to the invention there is also provided an aerosol-generating article comprising an aerosol-forming substrate and a susceptor assembly according to the present invention and as described herein for inductively heating the substrate.

Preferably, the susceptor assembly is located or embedded in the aerosol-forming substrate.

As used herein, the term "aerosol-forming substrate" relates to a substrate capable of releasing volatile compounds that can form an aerosol upon heating the aerosol-forming substrate. The aerosol-forming substrate may conveniently be part of an aerosol-generating article. The aerosol-forming substrate may be a solid or a liquid aerosol-forming substrate. In both cases, the aerosol-forming substrate may comprise both solid and liquid components. The aerosol-forming substrate may comprise a tobacco-containing material containing volatile tobacco flavour compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerine and propylene glycol. The aerosol-forming substrate may also comprise other additives and ingredients, such as nicotine or flavourants. The aerosol-forming substrate may also be a paste-like material, a sachet of porous material comprising aerosol-forming substrate, or, for example, loose tobacco mixed with a gelling agent or sticky agent, which could include a common aerosol former such as glycerine, and which is compressed or molded into a plug.

The aerosol-generating article is preferably designed to engage with an electrically-operated aerosol-generating device comprising an induction source. The induction source, or inductor, generates a fluctuating electromagnetic field for heating the susceptor assembly of the aerosol-generating article when located within the fluctuating electromagnetic field. In use, the aerosol-generating article engages with the aerosol-generating device such that the susceptor assembly is located within the fluctuating electromagnetic field generated by the inductor.

Further features and advantages of the aerosol-generating article according to the invention have been described with regard to susceptor assembly and will not be repeated.

According to the invention there is also provided a method for producing a susceptor assembly for inductively heating an aerosol-forming substrate, in particular for producing a susceptor assembly according to the present invention and as described herein. The method comprises at least the following steps:

- providing a first susceptor;
- providing a second susceptor, wherein a Curie temperature of the second susceptor is lower than 500° C.;
- applying an anti-corrosion covering to at least a portion of an outer surface of the second susceptor.

The method may further comprise the step of assembling the first and the second susceptor to be in intimate physical contact with each other. For assembling the first and second susceptor, the second susceptor may be plated, deposited, coated, cladded or welded onto the first susceptor.

Likewise, the anti-corrosion covering may be plated, deposited, coated, cladded or welded onto at least the portion of the outer surface of the second susceptor. Preferably, the anti-corrosion covering is applied onto the second susceptor by spraying, dip coating, roll coating, electroplating or cladding.

The first and the second susceptor may be assembled prior to applying an anti-corrosion covering. Alternatively, the first susceptor, the second susceptor and the anti-corrosion covering may be assembled simultaneously. This may prove advantageous for example in case of a multilayer susceptor assembly, in particular in case the first susceptor, the second susceptor and the anti-corrosion covering are assembled by cladding.

Further features and advantages of the method according to the present invention have been described with regard to the susceptor assembly and the aerosol-generating article and will not be repeated.

Below there is provided a non-exhaustive list of non-limiting examples.

Example Ex1: A susceptor assembly for inductively heating an aerosol-forming substrate, comprising a first susceptor and a second susceptor, the second susceptor having a Curie temperature lower than 500° C., wherein at least a portion of an outer surface of the second susceptor comprises an anti-corrosion covering and wherein at least a portion of an outer surface of the first susceptor is exposed.

Example Ex2: The susceptor assembly according to example Ex1, wherein the anti-corrosion covering comprises at least one of a corrosion-proof metal, an inert metal, a corrosion-proof alloy, a corrosion-proof organic coating, a glass, a ceramic, a polymer, an anti-corrosion paint, a wax or a grease.

Example Ex3: The susceptor assembly according to example Ex1 or Ex2, wherein the first susceptor comprises ferromagnetic stainless steel and wherein the second susceptor comprises nickel or a nickel alloy.

Example Ex4: The susceptor assembly according to any one of the preceding examples, wherein the first susceptor or the second susceptor or both, the first and the second susceptor, have a planar or blade-like shape.

Example Ex5: The susceptor assembly according to any one of the preceding examples, wherein the first susceptor and the second susceptor are in intimate physical contact with each other.

Example Ex6: The susceptor assembly according to any one of the preceding examples, wherein the susceptor assembly is a multilayer susceptor assembly, and wherein the first susceptor, the second susceptor and the anti-corrosion covering form adjacent layers of the multilayer susceptor assembly.

Example Ex7: The susceptor assembly according to example Ex6, wherein the anti-corrosion covering is an edge layer of the multilayer susceptor assembly.

Example Ex8: The susceptor assembly according to any one of the preceding examples, wherein all portions of the outer surface of the second susceptor—unless in intimate physical contact with the first susceptor—comprise an anti-corrosion covering.

Example Ex9: The susceptor assembly according to any one of the preceding examples, wherein all portions of an outer surface of the first susceptor—unless in intimate physical contact with the first susceptor—are exposed.

Example Ex10: The susceptor assembly according to any one of the preceding examples, wherein the second susceptor comprises one or more second susceptor elements, each being in intimate physical contact with the first susceptor, wherein at least a portion of an outer surface of each second susceptor element comprises an anti-corrosion covering.

Example Ex11: An aerosol-generating article comprising an aerosol-forming substrate and a susceptor assembly according to any one of the preceding examples.

Example Ex12: The aerosol-generating article according to example Ex11, wherein the susceptor assembly is embedded in the aerosol-forming substrate.

Example Ex13: A method for producing a susceptor assembly for inductively heating an aerosol-forming substrate, the method comprising the following steps:

providing a first susceptor;

providing a second susceptor, wherein a Curie temperature of the second susceptor is lower than 500 applying an anti-corrosion covering to at least a portion of an outer surface of the second susceptor.

Example Ex14: The method according to example Ex13, further comprising the step of assembling the first and the second susceptor to be in intimate physical contact with each other prior to applying the anti-corrosion covering.

Example Ex15: The method according to any of example Ex13 or Ex14, wherein the anti-corrosion covering is plated, deposited coated, cladded or welded onto at least the portion of the outer surface of the second susceptor.

The invention will be further described, by way of example only, with reference to the accompanying drawings, in which.

Figure 1:
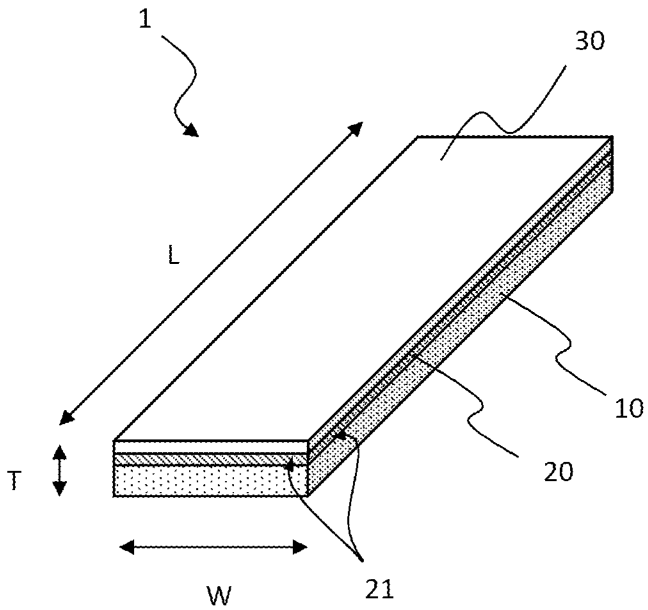
FIG. 1 shows a schematic perspective illustration of a first embodiment of a multilayer susceptor assembly according to the invention.
Figure 2:
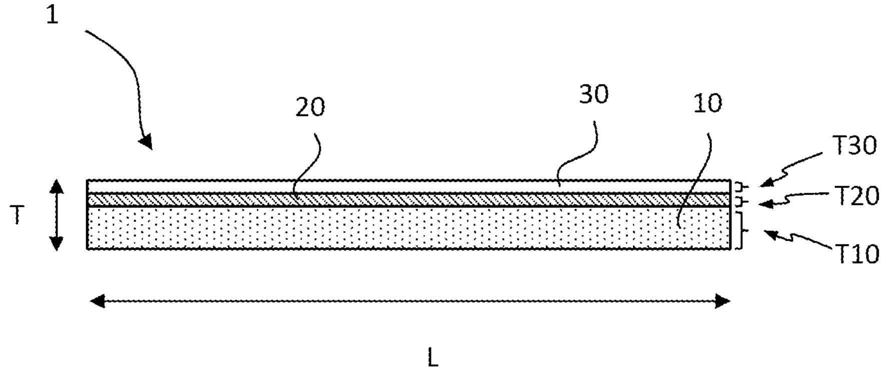
FIG. 2 shows a schematic side-view illustration of the susceptor assembly according to FIG. 1.

FIG. 1 and FIG. 2 schematically illustrate a first embodiment of a susceptor assembly 1 according to the present invention that is configured for inductively heating an aerosol-forming substrate. As will be explained below in more detail with regard to FIG. 8 and FIG. 9, the susceptor assembly 1 is preferably configured to be embedded in an aerosol-generating article, in direct contact with the aerosol-forming substrate to be heated. The article itself is adapted to be received within an aerosol-generating device which comprises an induction source configured for generating an alternating, in particular high-frequency electromagnetic field. The fluctuating field generates eddy currents and/or hysteresis losses within the susceptor assembly causing the assembly to heat up. The arrangement of the susceptor assembly in the aerosol-generating article and the arrangement of the aerosol-generating article in the aerosol-generating device are such that the susceptor assembly is accurately positioned within the fluctuating electromagnetic field generated by the induction source.

The susceptor assembly 1 according to the first embodiment shown in FIG. 1 and FIG. 2 is a three-layer susceptor assembly 1. The assembly comprises a first susceptor 10 as base layer. The first susceptor 10 is optimized with regard to heat loss and thus heating efficiency. For this, the first susceptor 10 comprises ferromagnetic stainless steel having a Curie temperature in excess of 400° C. For controlling the heating temperature, the susceptor assembly 1 comprises a second susceptor 20 as intermediate or functional layer being arranged upon and intimately coupled to the base layer. The second susceptor 20 comprises nickel having a Curie temperature of in the range of about 354° C. to 360° C. or 627 K to 633 K, respectively (depending on the nature of impurities), which proves advantageous with regard to both, temperature control and controlled heating of aerosol-forming substrate. Once the susceptor assembly reaches the Curie temperature of nickel during heating, the magnetic properties of the second susceptor 20 change as a whole. This change can be detected as reduced power dissipation, whereupon heat generation may be decreased or interrupted, for example by a controller of an aerosol-generating device the susceptor assembly is to be used with. When the assembly has cooled down below the Curie temperature and the second susceptor 20 has regained its ferromagnetic properties, heat generation can be increased or resumed.

Nickel, however, is susceptible to corrosion. Therefore, the susceptor assembly comprises a top layer of an anti-corrosion covering 30 arranged upon and intimately coupled to the intermediate layer. This top layer protects the second susceptor 20 from corrosion, in particular when the susceptor assembly 1 is embedded in an aerosol-forming substrate.

With regard to the first embodiment shown in FIG. 1 and FIG. 2, the susceptor assembly 1 is in the form of an elongate strip having a length L of 12 mm and a width W of 4 mm. All layers have a length L of 12 mm and a width W of 4 mm. The first susceptor 10 is a strip of grade 430 stainless steel having a thickness T10 of 35 μm. The second susceptor 20 is a strip of nickel having a thickness T20 of 10 μm. The anti-corrosion material 30 is a strip of austenitic stainless steel having a thickness T30 of 10 μm. The total thickness T of the susceptor assembly 1 is 55 μm. The susceptor assembly 1 is formed by cladding the strip of nickel 20 to the strip of stainless steel 10. After that, the austenitic stainless steel strip 30 is cladded on top of the nickel strip 20 such that the entire top surface of the second susceptor 20—opposite to its bottom surface being in intimate contact with the first susceptor 10—is covered by the anti-corrosion material. In contrast, a circumferential outer surface 21 of the second susceptor 20 is not covered by the anti-corrosion covering 30, but exposed to the environment of the susceptor assembly 1. Due to the small thickness T20 of the second susceptor 20, its unprotected circumferential outer surface 21 is negligible as compared to its top and bottom surface being in contact with and protected by the first susceptor 10 and the anti-corrosion covering 30, respectively. Therefore, the susceptor assembly 1 according to this first embodiment has significant improved aging characteristics as compared to a susceptor assembly without any anti-corrosion covering.

As the first susceptor 10 is made of stainless steel, it is resistant to corrosion and does not require any anti-corrosion covering. The entire outer surface of the first susceptor 10—unless in intimate contact with the second susceptor 20—is deliberately chosen to be bare or exposed to the environment of the susceptor assembly 1. Advantageously, this ensures maximum heat transfer to the aerosol-forming substrate.

Figure 3:
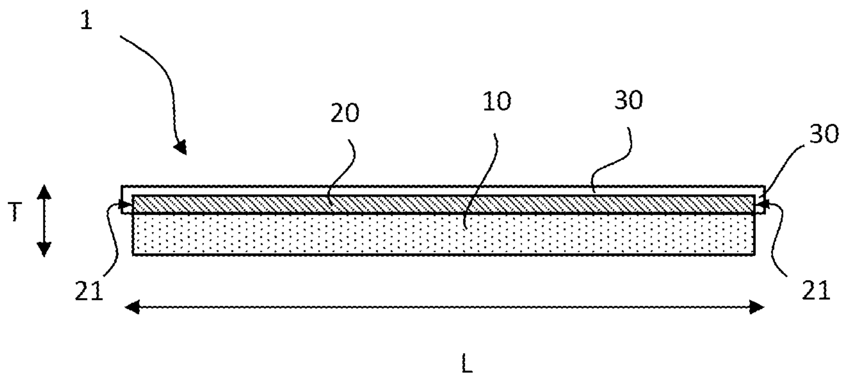
FIG. 3 shows a schematic cross-sectional illustration of second embodiment of a multilayer susceptor assembly according to the invention.

FIG. 3 illustrates a second embodiment of the susceptor assembly 1, which is very similar to the first embodiment shown in FIG. 1 and FIG. 2. Therefore, identical features are denoted with identical reference numbers. In contrast to the first embodiment, the anti-corrosion covering 30 in this second embodiment covers not only the top surface of the second susceptor 20, but also its lateral circumferential surface 21. This configuration advantageously allows for maximum protection of the second susceptor 20. The second susceptor 20 has the same width and length extension than the first susceptor 10. Therefore, the anti-corrosion covering 30 laterally projects above the width and length extension of the first and second susceptor 10, 20. The covering 30 may be attached to the bonded first and second susceptor by applying a strip of austenitic stainless steel on top of the second susceptor 20, beading over the rim portions of the covering strip to the circumferential surface 21 of the second susceptor 20, and subsequently cladding the covering strip to the covered circumferential and top surface of the second susceptor 20.

Figure 4:
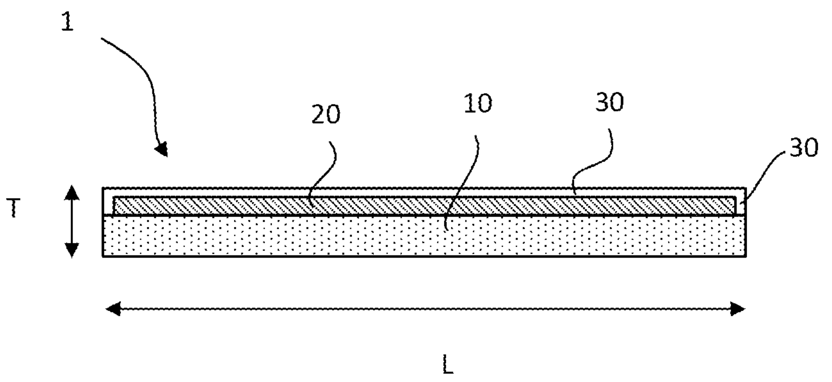
FIG. 4 shows a schematic cross-sectional illustration of third embodiment of a multilayer susceptor assembly according to the invention.

FIG. 4 illustrates a third embodiment of the susceptor assembly 1, which differs from the second embodiment according to FIG. 3 in that the anti-corrosion covering 30 covers in addition at least partially a lateral circumferential surface of the first susceptor 10. This configuration may result from applying the covering material by dip-coating or spraying onto the bonded first and second susceptor and may thus have advantages with regard to a simple manufacture. Apart from that, the susceptor assembly 1 according to this third embodiment advantageously has a regular outer surface without any recessed and protruding portions.

Figure 5:
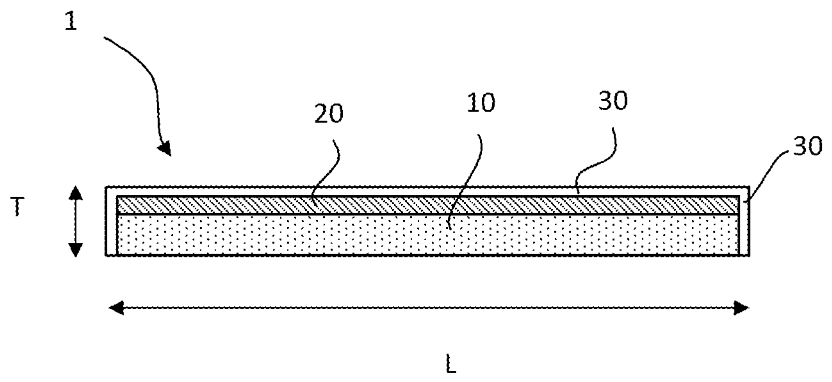
FIG. 5 shows a schematic cross-sectional illustration of fourth embodiment of a multilayer susceptor assembly according to the invention.

FIG. 5 illustrates a fourth embodiment of the susceptor assembly 1, which is also similar to the afore-mentioned embodiments. In contrast to these, the width and length extension of the second susceptor 20 of the fourth embodiment is slightly smaller than the width and length extension of the first susceptor 10. Thus, when attached to each other, there is a circumferential lateral offset between the first and the second susceptor. The volume of this circumferential offset is—in addition to the top surface of the second susceptor also filled with anti-corrosion covering material. This results in a susceptor assembly 1 having a regular outer shape and a maximum anti-corrosion protection of the second susceptor 20.

Figure 6:
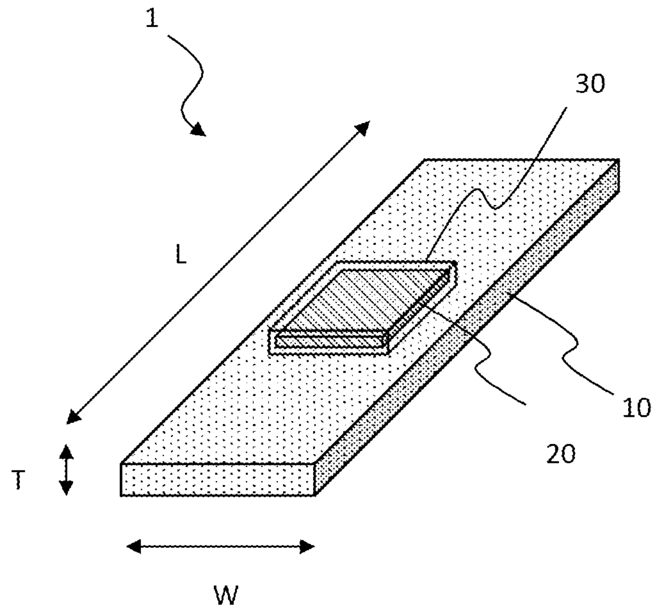
FIG. 6 shows a schematic perspective illustration of fifth embodiment of a multilayer susceptor assembly according to the invention.
Figure 7:
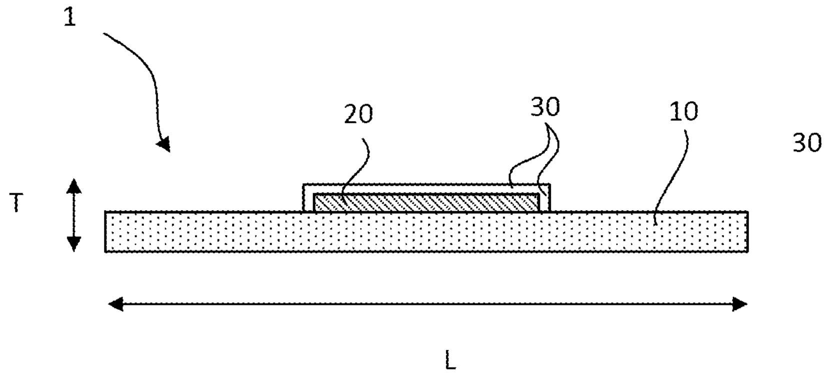
FIG. 7 shows a schematic cross-sectional illustration of the susceptor assembly according to FIG. 6.

FIG. 6 and FIG. 7 illustrate a fifth embodiment of a susceptor assembly 1 which is also in the form of an elongate strip having for example a length L of 12 mm and a width W of 4 mm. The susceptor assembly is formed from a first susceptor 10 that is intimately coupled to a second susceptor 20. The first susceptor 10 is a strip of grade 430 stainless steel having dimensions of 12 mm by 4 mm by 35 μm and thus defines the basic shape of the susceptor assembly 1. The second susceptor 20 is a patch of nickel of dimensions 3 mm by 2 mm by 10 μm. The patch of nickel has been electroplated onto the strip of stainless steel. Though the patch of nickel is significantly smaller than the strip of stainless steel, it is still sufficient to allow for accurate control of the heating temperature. Advantageously, the susceptor assembly 1 according to this fifth embodiment provides significant savings in second susceptor material. As can be seen from FIG. 6 and FIG. 7, the entire outer surface of the patch—unless in intimate contact with the first susceptor 10—is capped by an anti-corrosion covering 30. In contrast, the entire outer surface of the first susceptor 10—unless in intimate contact with the second susceptor 20—is uncovered to allow for maximum heat transfer. Alternatively, at least those portions of the top surface of the first susceptor 10 being not in contact with the second susceptor 20 may also be covered by the anti-corrosion covering. In further embodiments (not shown), there may be more than one patch of the second susceptor 20 located in intimate contact with the first susceptor 10.

As mentioned above, the susceptor assembly accordingly to the present invention is preferably configured to be part of an aerosol-generating article including an aerosol-forming substrate to be heated.

Figure 8:
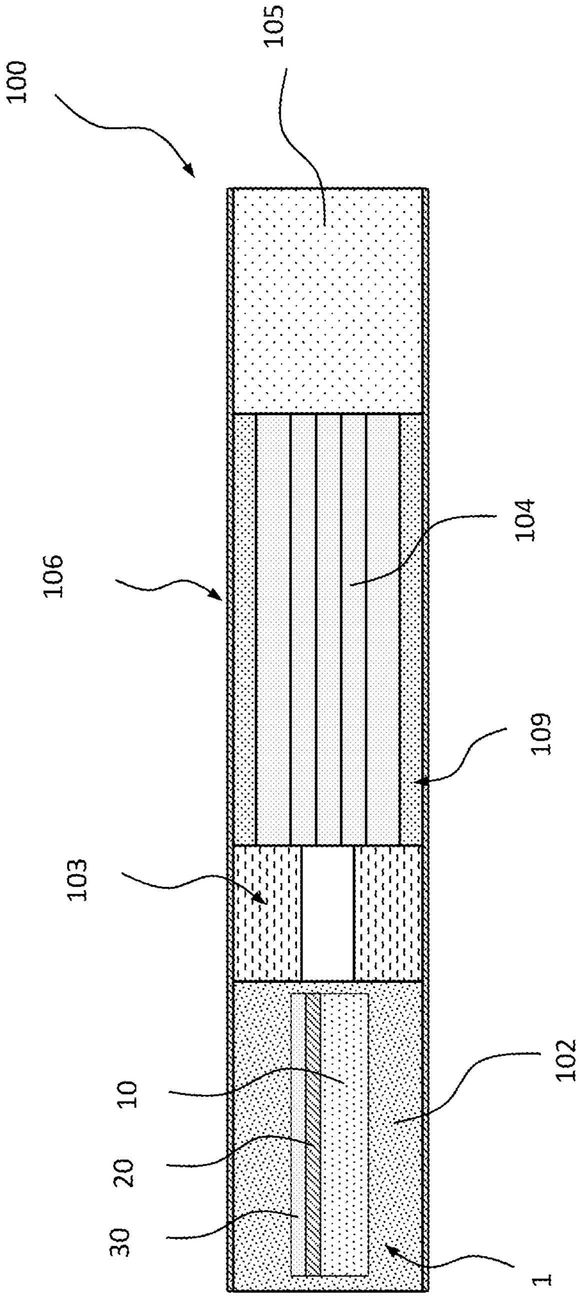
FIG. 8 shows a schematic cross-sectional illustration of first embodiment of an aerosol-generating article according to the invention.

FIG. 8 schematically illustrates a first embodiment of such an aerosol-generating article 100 according to the present invention. The aerosol-generating article 100 comprises four elements arranged in coaxial alignment: an aerosol-forming substrate 102, a support element 103, an aerosol-cooling element 104, and a mouthpiece 105. Each of these four elements is a substantially cylindrical element, each having substantially the same diameter. These four elements are arranged sequentially and are circumscribed by an outer wrapper 106 to form a cylindrical rod. Further details of this specific aerosol-generating article, in particular of the four elements, are disclosed in WO 2015/176898 A1.

An elongate susceptor assembly 1 is located within the aerosol-forming substrate 102, in contact with the aerosol-forming substrate 102. The susceptor assembly 1 as shown in FIG. 8 corresponds to the susceptor assembly 1 according to the first embodiment described above in relation to FIGS. 1 and 2. The layer structure of the susceptor assembly as shown in FIG. 8 is illustrated oversized, but not true to scale with regard to the other elements of the aerosol-generating article. The susceptor assembly 1 has a length that is approximately the same as the length of the aerosol-forming substrate 102, and is located along a radially central axis of the aerosol-forming substrate 102. The aerosol-forming substrate 102 comprises a gathered sheet of crimped homogenized tobacco material circumscribed by a wrapper. The crimped sheet of homogenized tobacco material comprises glycerin as an aerosol-former.

The susceptor assembly 1 may be inserted into the aerosol-forming substrate 102 during the process used to form the aerosol-forming substrate, prior to the assembly of the plurality of elements to form the aerosol-generating article.

The aerosol-generating article 100 illustrated in FIG. 8 is designed to engage with an electrically-operated aerosol-generating device. The aerosol-generating device may comprise an induction source having an induction coil or inductor for generating an alternating, in particular high-frequency electromagnetic field in which the susceptor assembly of the aerosol-generating article is located in upon engaging the aerosol-generating article with the aerosol-generating device.

Figure 9:
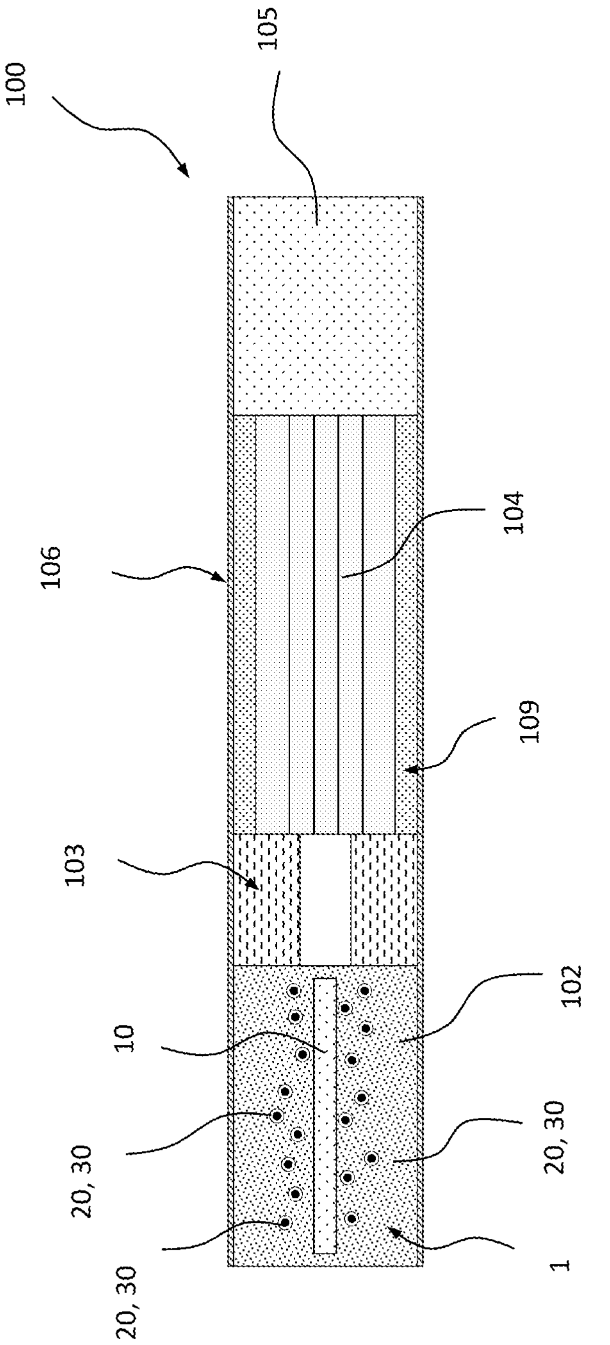
FIG. 9 shows a schematic cross-sectional illustration of second embodiment of an aerosol-generating article according to the invention.

FIG. 9 shows another embodiment of an aerosol-generating article 100 according to the present invention. The embodiment of FIG. 9 differs from the embodiment shown in FIG. 8 only with regard to the susceptor assembly 1. Instead of a multilayer susceptor assembly having a first and second susceptor layer as well as an anti-corrosion layer in intimate physical contact with each other, the susceptor assembly according to FIG. 9 comprises a first and second susceptor being separate from each other and having different geometrical configurations. The first susceptor 10 which is responsible for heating the aerosol-forming substrate 102 is a blade made of ferromagnetic stainless steel. The blade has a length that is approximately the same as the length of the aerosol-forming substrate 102. The blade is located along a radially central axis of the aerosol-forming substrate 102. The second susceptor 20 is of particulate configuration comprising a plurality of nickel particles. The particles may have an equivalent spherical diameter of 10 μm to 100 μm. The entire outer surface of each of the nickel particles 20 comprises an anti-corrosion covering 30, for example a ceramic covering. The thickness of the covering 30 may be about 10 μm. The anti-corrosion covering is applied to the nickel particles prior to embedding the covered particles into the aerosol-forming substrate 102.

The particles are distributed throughout the aerosol-forming substrate 102. Preferably, the particle distribution has local concentration maximum in proximity to the first susceptor 10 to ensure an accurate control of the heating temperate.

Instead of a blade configuration, the first susceptor 10 may alternatively be of one of a filament, or mesh-like, or wire-like configuration.

The first and second susceptor 10, 20 may be inserted into the aerosol-forming substrate 102 during the process used to form the aerosol-forming substrate, prior to the assembly of the plurality of elements to form the aerosol-generating article.

It should be noted though, that as need may be, the geometrical configuration of the first and second susceptor may be interchanged. Thus, the second susceptor may be one of a filament, or mesh-like, or wire-like or a blade configuration comprising an anti-corrosion covering, and the first susceptor material may be of particulate configuration.

The invention claimed is:

1. An aerosol-generating article comprising an aerosol-forming substrate and a susceptor assembly for inductively heating the aerosol-forming substrate, the susceptor assembly comprising a first susceptor and a second susceptor, the second susceptor having a Curie temperature below an ignition point of the aerosol-forming substrate, wherein at least a portion of an outer surface of the second susceptor comprises an anti-corrosion covering and wherein at least a portion of an outer surface of the first susceptor is exposed.

2. The aerosol-generating article according to claim 1, wherein the anti-corrosion covering comprises at least one of a corrosion-proof metal, an inert metal, a corrosion-proof alloy, a corrosion-proof organic coating, a glass, a ceramic, a polymer, an anti-corrosion paint, a wax or a grease.

3. The aerosol-generating article according to claim 1, wherein the anti-corrosion covering is paramagnetic.

4. The aerosol-generating article according to claim 1, wherein the first susceptor comprises ferromagnetic stainless steel.

5. The aerosol-generating article according to claim 1, wherein the second susceptor comprises nickel or a nickel alloy.

6. The aerosol-generating article according to claim 1, wherein the Curie temperature of the second susceptor corresponds to a predefined maximum heating temperature of the first susceptor.

7. The aerosol-generating article according to claim 1, wherein the first susceptor, or the second susceptor, or both the first and the second susceptor, have a planar or blade-like shape.

8. The aerosol-generating article according to claim 1, wherein the first susceptor and the second susceptor are in intimate physical contact with each other.

9. The aerosol-generating article according to claim 1, wherein the susceptor assembly is a multilayer susceptor assembly, and wherein the first susceptor, the second susceptor and the anti-corrosion covering form adjacent layers of the multilayer susceptor assembly.

10. The aerosol-generating article according to claim 9, wherein the anti-corrosion covering is an edge layer of the multilayer susceptor assembly.

11. The aerosol-generating article according to claim 1, wherein all portions of the outer surface of the second susceptor, unless in intimate physical contact with the first susceptor, comprise an anti-corrosion covering.

12. The aerosol-generating article according to claim 1, wherein all portions of the outer surface of the first susceptor, unless in intimate physical contact with the second susceptor, are exposed.

13. The aerosol-generating article according to claim 1, wherein the second susceptor comprises one or more second susceptor elements, each being in intimate physical contact with the first susceptor, wherein at least a portion of an outer surface of each second susceptor element comprises an anti-corrosion covering.

14. The aerosol-generating article according to claim 1, wherein the susceptor assembly is embedded in the aerosol-forming substrate.

* * * * *